July 5, 1932.　　　W. L. DAVEY　　　1,866,015
WATER HEATING AND COOKING DEVICE FOR AUTOMOBILES
Filed March 24, 1930
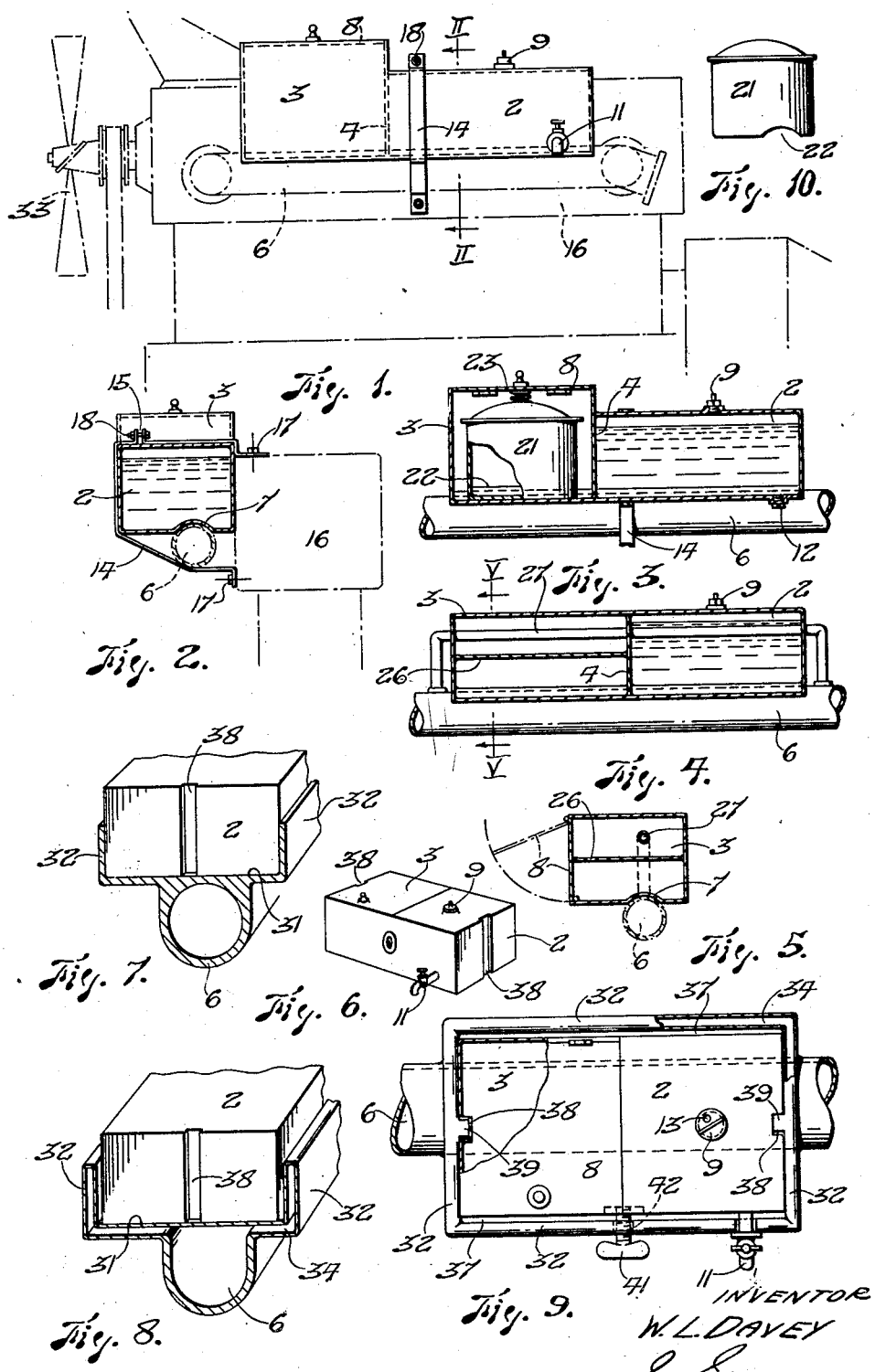

Patented July 5, 1932

1,866,015

UNITED STATES PATENT OFFICE

WALTER LESLIE DAVEY, OF MELBOURNE, VICTORIA, AUSTRALIA

WATER HEATING AND COOKING DEVICE FOR AUTOMOBILES

Application filed March 24, 1930, Serial No. 438,595, and in Australia November 2, 1929.

This invention relates to a device adapted for application to the exhaust manifold of an automobile engine whereby the heat of the exhaust gases may be utilized for boiling or heating water or other liquids and for cooking and like purposes, the invention being particularly useful for picnickers and travellers.

The primary object of the present invention is to provide a device consisting of a water tank or boiler and/or cooking vessel or oven adapted for fitting to the exhaust manifold of an automobile engine so that the heat from the exhaust gases is communicated to said tank or vessel and water and food stuffs may be thus heated or cooked whilst the automobile is travelling, the device being readily accessible and the water being preferably drawn off from the tank by means of a tap thereon.

Another object of the present invention is to provide means in connection with the above device whereby the exhaust manifold is adapted to afford an extended heating surface and the mounting of the water heating tank and the cooking vessel on the manifold is facilitated.

Various other objects and advantages resulting from the use of this invention will be more readily appreciated from the following description.

Referring to the drawing:—

Figure 1 is a side elevation showing a device in accordance with this invention applied to the exhaust manifold of an automobile engine which is indicated in broken lines.

Figure 2 is a cross section on line II—II of Figure 1.

Figure 3 is a longitudinal section of the arrangement seen in Figure 1.

Figure 4 is a longitudinal section of a modification.

Figure 5 is a cross section taken on the line V—V of Figure 4.

Figure 6 is a perspective view on a reduced scale of a water heating and cooking vessel in accordance with a modification of the invention.

Figure 7 is a fragmentary section of another modification in which the engine manifold is provided with an extended heating surface.

Figures 8 and 9 are a fragmentary section and a plan view respectively of a further modification wherein the extended heating surface of the manifold is of hollow construction.

Figure 10 is an end view of the removable receptacle seen in Figure 3.

In accordance with this invention the water tank or boiler 2 and the cooking vessel or oven 3 may be formed as a unit divided by one or more vertical partitions 4, into the desired water heating and cooking compartments or, if desired, separate water heating and cooking vessels, or only a water heating or a cooking vessel may be employed.

According to the embodiment illustrated in Figures 1 to 3, the water heating and cooking vessel 2, 3, extends longitudinally of and is adapted to fit over the top of the engine manifold 6. For this purpose the bottom of the said vessel may be provided with a longitudinal groove or channel 7 adapted to snugly accommodate the top of the manifold as seen in Figure 2, thus assisting to seat the vessel firmly in position and at the same time extending the heating surface between the two co-operating members.

The cooking vessel or oven 3 is provided with a hinged door 8, located either at the top or at one side thereof, whilst the water tank 2 is provided with a closure cap or plug 9, a draw-off tap 11 and if desired a drain plug 12. A small vent aperture 13 is preferably formed in said closure cap or plug to permit of the escape of steam and promote the flow of liquid from the vessel.

In combination with the foregoing, means are provided for securely retaining the said vessel in position on the manifold, and such retaining means may comprise a strap or band 14 adapted to be passed around the vessel and the manifold and secured to the cylinder head 16 by suitable means such, for instance as existing bolts 17 of the engine.

The strap or band 14 may be divided transversely as at 15 and provided with a clamping bolt 18 for the purpose of tightening the band.

If desired the cooking vessel or oven 3 may be extended upwardly in relation to the water tank 2 for the purpose of accommodating a removable receptacle 21 the bottom of which is preferably grooved or channelled as at 22 (Figure 3) in order to accommodate the upwardly channelled portion 7 of the vessel 3, immediately over the manifold 6 and thus receive the maximum of heat therefrom.

In this embodiment the door 8 is preferably located at the top of the cooking vessel or oven and may be provided with a suitable spring 23 for holding the vessel 21 in the desired position above the manifold.

According to a modification as illustrated in Figures 4 and 5, the oven 3 is provided with a horizontal shelf or shelves 26 adapted to receive plates or other relatively flat dishes on which foodstuffs may be heated, and in this case the hinged door 8 is located at the front of the oven.

If desired, additional heat may be supplied to both the water tank and the cooking vessel or oven by means of one or more branch superheater pipes 27 extending longitudinally through the compartments 2, 3, and communicating at both ends with the exhaust manifold.

In accordance with another embodiment of the invention as illustrated in Figures 7 to 9 the upper surface of the exhaust manifold 6 is preferably flattened and extended sidewardly so as to provide an extended base member and heating surface 31 on which the water heating and cooking vessel (or vessels) is adapted to rest.

Upstanding from the said base member 31 are walls or fins 32 between which the vessel 2, 3, is accommodated. These walls or fins preferably extend along the back and front sides and the two ends of the said vessel so as to form an open topped box-like enclosure to receive the said vessel. The said walls or fins are adapted to further extend the heating surface of the exhaust manifold and to provide a convenient means of retaining the desired vessel (or vessels) in position thereon.

In addition to the above mentioned function the end wall or fin 32 nearest the front of the engine is also adapted to protect the water heating and cooking vessel from the cooling effect of the draft from the engine fan 33.

As seen in Figure 7 the base member 31 and the walls or fins 32 upstanding therefrom may be of solid construction so as to transmit the heat from the manifold merely by conduction through the metal or these parts may be of hollow construction as seen in Figures 8 and 9 to thereby provide an extended heating chamber or jacket 34 which communicates with the interior of the manifold and extends beneath and upwardly around the sides and ends of the said vessel, thus lessening the time required for the water heating and/or cooking operations.

If desired the upstanding walls or fins 32 may be provided only at the sides or ends or only at the front or outer side of the water heating and cooking vessel but preferably they extend completely around the said vessel so as to form an open topped box-like enclosure as seen in Figure 9.

The wall or fin 32 upstanding from the base member 31 on the manifold at the front of the water heating and cooking vessel may be provided with a slot or aperture to pass the tap of the water tank 2.

In order to prevent overheating or the too rapid heating of the vessel 2, 3, when used in accordance with the embodiments illustrated in Figures 7 to 9, it may, if desired, be formed slightly smaller than the box-like enclosure formed by the upstanding walls or fins 32 so that a slight insulating space 37 is left between the front and rear walls of the enclosure and the adjacent walls of the vessel. This space may, if desired, be filled in with insulating material according to requirements.

Coinciding vertical slots and projections 38 and 39 may be formed on the vessel 2, 3, and the end walls or fins 32 of the box-like enclosure, so that the said vessel is especially adapted to fit the particular manifold for which it is constructed and is firmly held against movement thereon.

A set screw or the like 41 may also be provided to afford a simple and convenient means of readily securing the water heating and cooking vessel removably in position. This set screw may pass through an aperture 42 in the front wall 32 and enter a screw threaded recess in the adjacent wall of the vessel which is thus held tightly so that any rattling or accidental displacement thereof is effectively prevented.

By the invention an extremely simple and inexpensive device, which may be readily applied to existing as well as to new automobiles, is provided whereby water and foodstuffs or other materials may be conveniently heated or cooked by the waste heat of the exhaust whilst the vehicle is travelling.

It will also be evident that the invention further provides a special exhaust manifold affording an extended heating surface and a means for conveniently and effectively mounting the water heating and/or cooking vessel upon the manifold which may also be applied to existing as well as to new engines in place of the usual exhaust manifold.

It is to be understood that various alterations, modifications and/or additions may be embodied in the foregoing construction and arrangement of parts without departing from the spirit and scope of the invention as defined by the appended claims.

Having now described my invention what I claim as new and desire to secure by Letters Patent is:—

1. An elongated exhaust manifold having a plurality of inlet ports communicating with the respective cylinders of an engine, said manifold having its upper portion extended laterally and upwardly to define a hollow base and hollow side and end walls, the interiors of which are in open communication with the manifold, with the base designed to directly support and the side and end walls to partially enclose a vessel to be heated.

2. An elongated exhaust manifold having a plurality of inlet ports adapted to communicate with the respective cylinders of an engine, the upper portion of the manifold being extended to provide a flat base and hollow side and end walls in open communication with the interior of the manifold, in combination with a vessel to rest upon the base within the area defined by the side and end walls, and cooperating means on the end walls and vessel to prevent independent lateral movement of the vessel when in position.

In testimony whereof I affix my signature.

W. L. DAVEY.